United States Patent [19]

Hirano et al.

[11] Patent Number: 5,419,697

[45] Date of Patent: May 30, 1995

[54] PRECISION INJECTION-MOLDING METAL MOLD

[75] Inventors: Keiichi Hirano; Teruo Saito, both of Ushiku; Kunihiko Maeoka, Kawasaki, all of Japan

[73] Assignee: Canon Kabushiki Kaisha, Tokyo, Japan

[21] Appl. No.: 308,200

[22] Filed: Sep. 19, 1994

Related U.S. Application Data

[63] Continuation of Ser. No. 921,330, Jul. 29, 1992, abandoned.

[30] Foreign Application Priority Data

Aug. 2, 1991 [JP] Japan ................. 3-193931
Aug. 2, 1991 [JP] Japan ................. 3-193932
Aug. 2, 1991 [JP] Japan ................. 3-193933

[51] Int. Cl.⁶ .......................................... B29C 45/73
[52] U.S. Cl. ................................ 425/552; 249/80; 249/111; 249/114.1; 249/135; 425/556
[58] Field of Search ............... 249/66.1, 79, 80, 111, 249/114.1, 135; 425/542, 552, 556

[56] References Cited

U.S. PATENT DOCUMENTS

| | | | |
|---|---|---|---|
| 1,774,426 | 8/1930 | Erichsen | 249/111 |
| 1,817,545 | 8/1931 | Copeman | 249/111 |
| 2,987,772 | 6/1961 | Beatty, Jr. | 249/80 |
| 3,321,932 | 5/1967 | Orphey, Jr. | 249/111 |
| 3,664,410 | 5/1972 | Groteke | 425/552 |
| 4,141,531 | 2/1979 | Strausfeld | 249/80 |
| 4,338,068 | 7/1982 | Suh et al. | 425/552 |
| 4,687,045 | 8/1987 | Roller | 249/135 |
| 4,733,849 | 3/1988 | Golz | 249/80 |
| 4,793,953 | 12/1988 | Maus | 264/2.5 |
| 4,884,961 | 12/1989 | Iizuka et al. | 249/80 |

FOREIGN PATENT DOCUMENTS

| | | |
|---|---|---|
| 55-55839 | 4/1980 | Japan ........... 249/111 |
| 56-164835 | 12/1981 | Japan . |
| 63-188022 | 8/1988 | Japan . |
| 2-187344 | 7/1990 | Japan . |
| 3-74913 | 7/1991 | Japan . |
| 3-193322 | 8/1991 | Japan . |

Primary Examiner—James P. Mackey
Attorney, Agent, or Firm—Fitzpatrick, Cella, Harper & Scinto

[57] ABSTRACT

An injection-molding metal mold used for injection-molding a body having a precision portion which is formed at high precision includes a molding cavity in which a precision molding portion for molding the precision portion is set to have a heat conductivity higher than that of general molding portions for molding other portions of the body and shortens the time required by a molding cycle to mold a body having a precision portion. Also, an injection-molding metal mold used for injection-molding a body having a precision portion which is formed at high precision includes a molding cavity constituted by a molding member in which a precision molding portion is formed to mold the precision portion and general molding portions for molding other portions. Also provided is an ejector pin, disposed adjacent to the molding member to partially constitute the cavity; for ejecting a molded body; and a cooling unit for cooling the molding member through the ejector pin. This injection-molding metal mold shortens the time required by a molding cycle to mold a body having a precision portion.

5 Claims, 8 Drawing Sheets

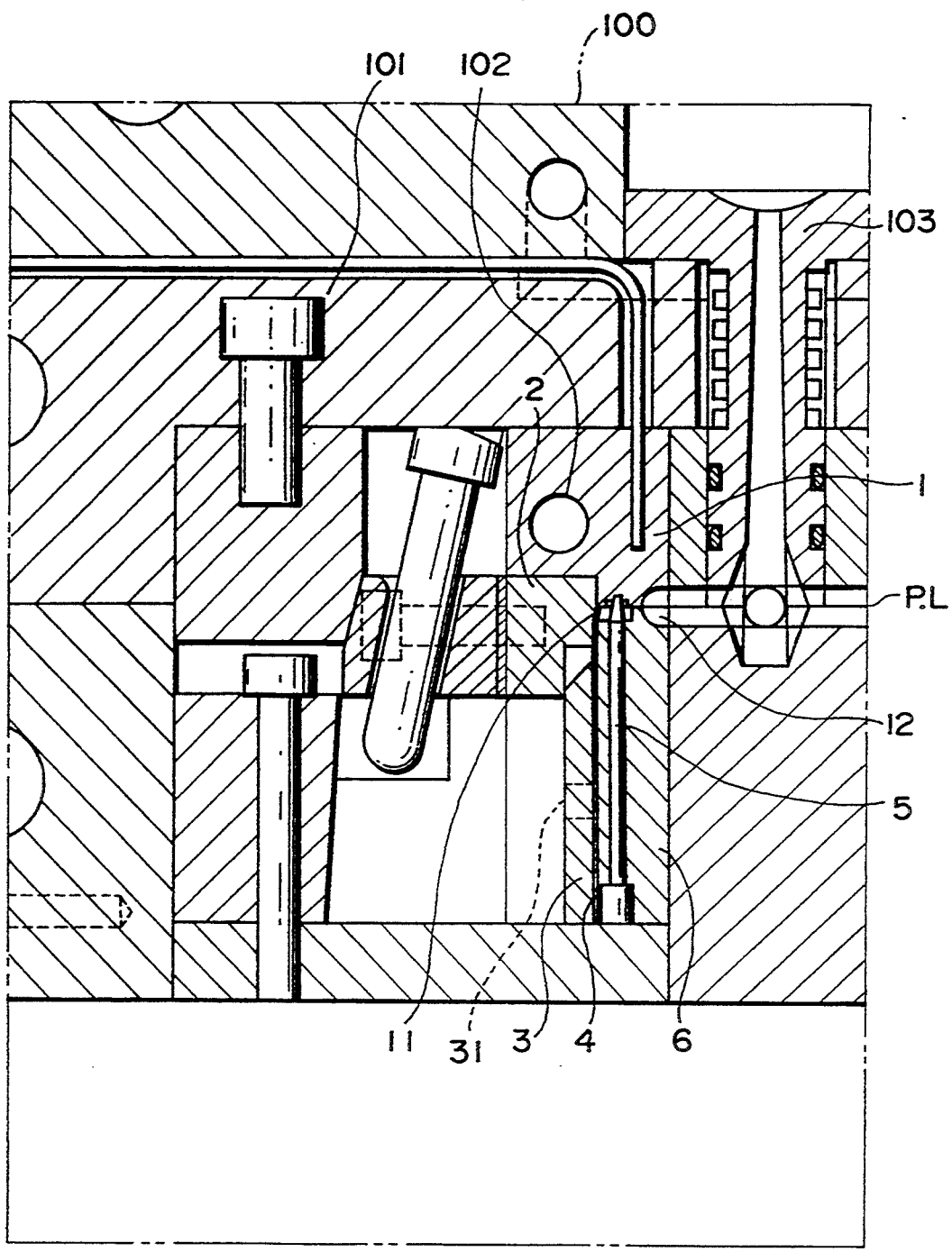
F I G. 1

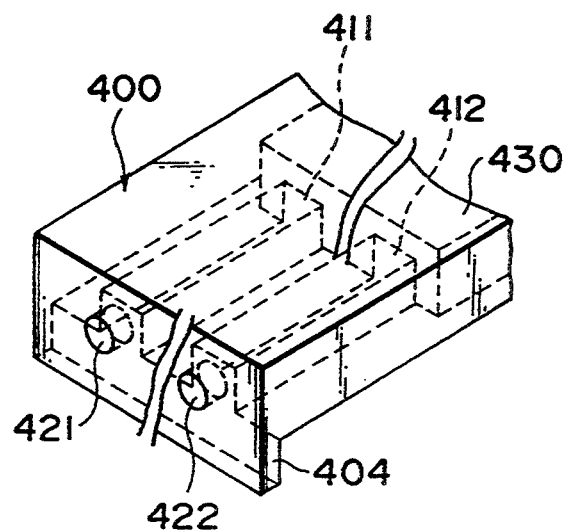
F I G. 9
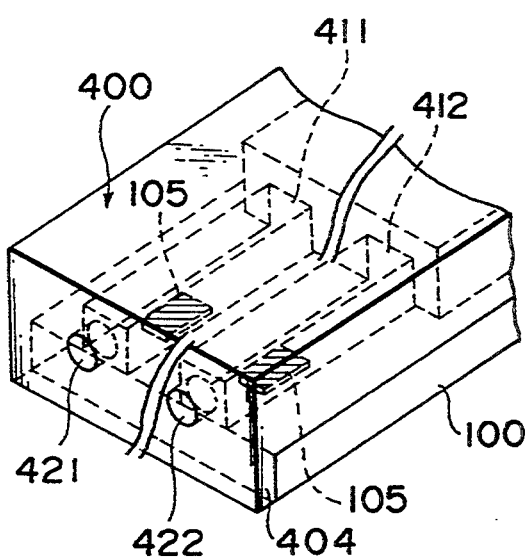
F I G. 10

PRECISION INJECTION-MOLDING METAL MOLD

This application is a continuation of application Ser. No. 07/921,330, filed Jul. 29, 1992, now abandoned.

BACKGROUND OF THE INVENTION

1. Field of the Invention

The present invention relates to an injection-molding metal mold used for molding a body having a high-precision portion by injection molding, and a body molded by using the metal mold more particularly, the invention relates to an injection-molding metal mold which can be suitably applied to, e.g., molding grooves that form ink flow channels of a liquid jet recording head having a grooved precision portion for flowing ink to discharge ports, so that ink droplets are discharged from the discharge ports to perform recording.

2. Prior Art

The present applicant previously proposes an ink-jet recording apparatus to which a liquid jet recording head integrally formed with an ink container is detachably mounted to improve the operability and to facilitate maintenance.

This ink-jet recording head is formed as a top plate component 400, which is an integral molded body as shown in FIGS. 9 and 10, integrally having a recessed portion 430 for forming a common ink chamber, multiple groove portions 411, 412, ... (only two are indicated by broken lines in FIG. 9) for forming ink flow channels communicating with the recessed portion 430, and an orifice plate portion 404. Ink discharge holes 421, 422, ... are formed in the orifice plate portion 404 by a laser boring device or the like.

In this manner, the top plate component 400 is integrally formed simultaneously with the orifice plate portion 404 in a metal mold. To form the groove portions 411, 412, ... for the ink flow channels, a molding portion, in which small grooves having a shape opposite to that of the groove portions are formed by cutting or the like, is formed in the cavity, and a resin is injected. As a result, the molded body of the top plate component 400 is obtained.

A heater board 100 having a discharge heater 105 and the like is abutted against the top plate component 400 obtained in this manner, and they are bonded to obtain a complete recording head body, as shown in FIG. 10.

The sizes of the respective portions of the recording head which is completed through the process described above are determined in accordance with the printer specifications. For example, when the dot recording density is high, the groove width of the groove portions 411, 412, ... is set to 32 μm (micron), and the width of a non-groove portion is set to 31.5 μm. As a result, the width of the projecting portions of the metal mold corresponding to the portions to define the groove portions 411, 412, ... is set to 31.5 μm.

In order to mold a body having small grooves as described above, a high-temperature molding method is conventionally performed. According to this method, a metal mold is kept at a high temperature to increase the flowability of the resin material, so that the resin material in the molten state can reliably reach the small groove portions to run in the molding portion, thereby performing injection molding.

SUMMARY OF THE INVENTION

However, when a molding portion having small grooves is formed in part of the cavity of a metal mold for molding a main part of a body having a precision portion, like the groove portions described above, cooling of this precision portion like the groove portion is delayed mostly because of the limitations in the structure of the cavity. In addition, since the precision portion requires particularly high forming precision, the molded body cannot be removed from the metal mold until this portion is completely hardened or cured, thus prolonging the molding cycle.

Meanwhile, when a molding member for forming the precision portion is made of a material having a high heat conductivity, e.g., phosphor bronze, to shorten the thermal shock cycle, since phosphor bronze has a low wear resistance, the molding portion for the high precision portion cannot be kept for a long period of time in the high precision state.

The present invention has been made in view of the above problems, and has as its object to shorten the molding cycle of a molded body having a precision portion.

It is another object of the present invention to improve durability of the cavity for molding a body having a precision portion.

It is still another object of the present invention to shorten time required by the molding cycle to mold a body having a precision portion.

When the cavity of a metal mold for molding a main part of a molded body having a precision portion, like the groove portion described above, is integrally formed, the working process becomes very complicated to increase the working cost.

The cavity molding portion for molding a precision portion can be easily worn compared to other cavity molding portions, and its size must be checked often or it must be exchanged often. If this cavity molding portion is integrally formed with other cavity molding portions, it cannot be size-checked or exchanged often.

The present invention has been made in view of the above problems, and has as its object to decrease the working cost of the cavity for molding a body having a precision portion and to facilitate maintenance of the precision molding portion.

In order to achieve the problems described above, according to the present invention, there is provided an injection-molding metal mold used for injection-molding a body having a precision portion which is formed at high precision, comprising a molding cavity in which a precision molding portion for molding the precision portion is set to have a heat conductivity higher than that of general molding portions for molding other portions of the body.

Preferably, according to the present invention, there is also provided an injection-molding metal mold used for injection-molding a body having a precision portion which is formed at high precision, wherein a precision molding portion for molding the precision portion is formed as a molding member made of a material having a high heat conductivity, general molding portions for molding portions other than the precision portion are formed from a material having a heat conductivity lower than that of the precision molding portion, and the molding member and the general molding portions constitute an injection-molding cavity.

Preferably, according to the present invention, there is also provided an injection-molding metal mold used for injection-molding a body having a precision portion which is formed at high precision, comprising: a molding cavity constituted by a molding member in which a precision molding portion is formed to mold the precision portion, and general molding portions for molding other portions; an ejector pin, disposed adjacent to the molding member to partially constitute the cavity, for ejecting a molded body; and cooling means for cooling the molding member through the ejector pin.

Preferably, according to the present invention, there is also provided an injection-molding metal mold used for injection-molding a body having a precision portion which is formed at high precision, which comprises: a molding cavity constituted by a molding member in which a precision molding portion is formed to mold the precision portion, and general molding portions for molding other portions; wherein the precision molding portion is formed at a predetermined portion of the molding member formed from a material having a high heat conductivity, the general molding portions for molding other portions are formed from a material having a heat conductivity lower than that of the precision molding portion, and the molding member and the general molding portions which are disposed separately from the molding member are combined to form an injection-molding cavity.

Preferably, according to the present invention, there is also provided a molded body molded by using an injection-molding metal mold used for injection-molding a body having a precision portion which is formed at high precision, the metal mold comprising a molding cavity in which a precision molding portion for molding the precision portion is set to have a heat conductivity higher than that of general molding portions for molding other portions.

Preferably, according to the present invention, there is also provided a molded body molded by using an injection-molding metal mold used for injection-molding a body having a precision portion which is formed at high precision, wherein a precision molding portion for molding the precision portion is formed as a molding member made of a material having a high heat conductivity, the general molding portions for molding portions other than the precision portion are formed from a material having a heat conductivity lower than that of the precision molding portion, and the molding member and the general molding portions constitute an injection-molding cavity.

Preferably, according to the present invention, there is also provided a molded body molded by using an injection-molding metal mold used for injection-molding a body having a precision portion which is formed at high precision, the metal mold comprising: a molding cavity constituted by a molding member in which a precision molding portion is formed to mold the precision portion, and general molding portions for molding other portions; an ejector pin, disposed adjacent to the molding member to partially constitute the cavity, for ejecting a molded body; and cooling means for cooling the molding member through the ejector pin.

Preferably, according to the present invention, there is also provided a molded body molded by using an injection-molding metal mold used for injection-molding a body having a precision portion which is formed at high precision, the metal mold comprising: a molding cavity constituted by a molding member in which a precision molding portion is formed to mold the precision portion, and general molding portions for molding other portions; wherein the precision molding portion is formed at a predetermined portion of the molding member formed from a material having a high heat conductivity, the general molding portions for molding other portions are formed from a material having a heat conductivity lower than that of the precision molding portion, and the molding member and the general molding portions which are disposed separately from the molding member are combined to form an injection-molding cavity.

With the above arrangement, when a molten resin is injected into a molding cavity in which a precision molding portion for molding the precision portion is set to have a heat conductivity higher than that of general molding portions for molding other portions, the precision molding portion is positively cooled to shorten time required by the molding cycle. When the molding member is cooled by the cooling means through the ejector pin, which is disposed adjacent to the molding member to partially constitute the cavity, for ejecting a molded body, time required by the molding cycle is shortened. More specifically, when the molten resin is injected into the cavity to injection-mold a body having a high-precision portion, for example, the molding member having a molding portion to mold the precision portion is positively cooled by the cooling means through the ejector pin, thereby shortening time required by the molding cycle.

Also, the molding member is forcibly cooled by an air flow through a through hole formed in the ejector pin.

In addition, the molding member is forcibly cooled by an air flow through an elongated through hole formed in the ejector pin.

Furthermore, the working cost of the cavity for molding a body having a precision portion is decreased, and maintenance of the precision molding portion is facilitated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a sectional view obtained by dividing an injection-molding metal mold into four pieces according to the first embodiment of the present invention;

FIG. 9 is a model view showing the shape of a molded body; and

FIG. 10 is a model view showing the completed state of the molded body.

It is to be understood that the present invention is not limited to the embodiments to be described later, and various changes and modifications can be made within the spirit and scope defined in the appended claims.

DETAILED DESCRIPTION OF THE PREFERRED EMBODIMENTS

Injection-molding metal molds according to the preferred embodiments of the present invention in which the precision portion is formed as an ink flow channel will be described with reference to the accompanying drawings.

FIG. 1 is a sectional view obtained by dividing an injection-molding metal mold into four pieces according to the first embodiment of the present invention. A central sprue 103 is continued to runners 12 branched into four directions to constitute a multi-cavity metal mold. FIG. 1 shows a cavity 11 communicating with one runner 12.

Figure 2:
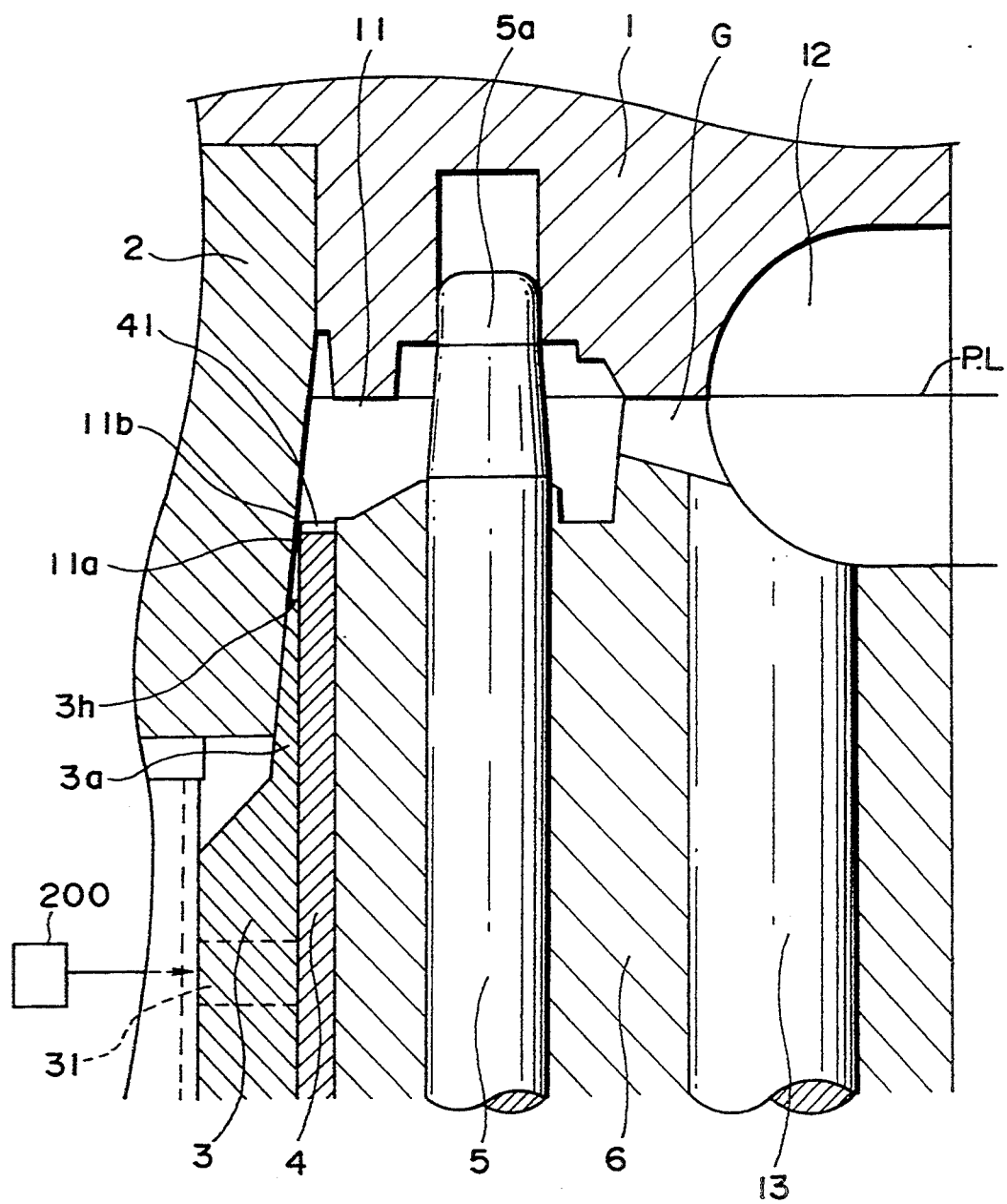
FIG. 2 is a sectional view of the main part of the periphery of a cavity shown FIG. 1.

FIG. 2 is a sectional view showing in detail the main part in the periphery of the cavity 11 of FIG. 1. Referring to FIG. 1, a metal mold 100 indicated by an alternate long and two short dashed line is constituted by a known multi-cavity mold having radially arranged slide members 2. A molten resin is injected into the cavity 11 through the sprue 103. After the resin is hardened or cured, the mold is opened at a parting surface PL, and a molded body is removed.

For this purpose, a stationary member 1 partially defining the upper portion of the cavity 11, the slide member 2 for mold closing, an ejector pin 3 partially defining the cavity 11 with its end portion, a telescopic pin 5 inserted in the cavity 11 to mold a space portion of a body, and a movable member 6 partially defining the lower portion of the cavity 11 and the lower portion of the runner 12 are disposed as shown in FIG. 1.

Referring to FIG. 2, a distal end portion 5a of the telescopic pin 5 is inserted in the cavity 11 communicating with the runner 12 through a film gate G. An ejector pin 13 guided by the movable member 6 to serve to remove the runner 12 is provided below the film gate G and the runner 12.

A groove portion 41 serving as a molding portion for the precision portion of the cavity 11 is formed on the upper side portion of the groove member 4 in the manner to be described later to partially define the cavity 11. A first narrow portion 11b (see FIG. 2) of the cavity 11 continuous to a lower plate portion or a second narrow portion 11a is provided in the left vicinity of the groove portion 41 in FIG. 2. The lower end portion of the plate portion 11a is closed by an upper end portion 3h of a projecting portion 3a of the ejector pin 3 which is gradually narrowed, as shown in FIG. 2, thus constituting the plate portion 11a of the cavity 11.

A hole portion 31 indicated by a broken line in FIG. 2 is formed in the ejector pin 3. Cooled air is supplied to the hole portion 1 from an air pump 200 to cool the ejector pin 3 and the groove member 4, thus promoting hardening of the molten resin in the cavity 11.

Figure 3:
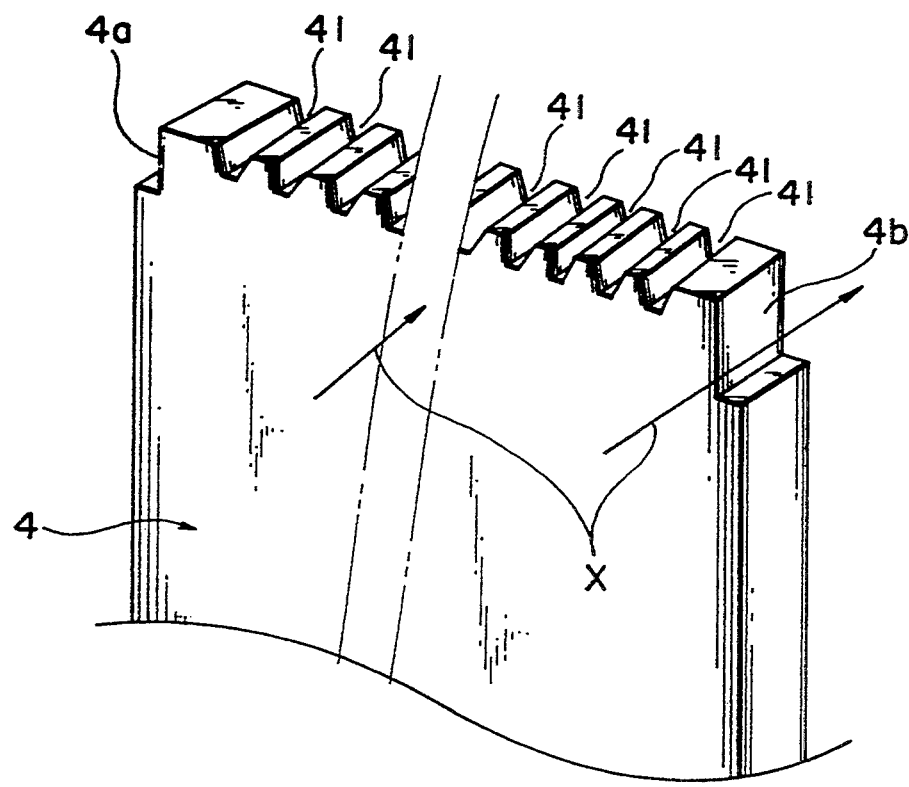
FIG. 3 is a perspective view showing an outer appearance of a groove member.

FIG. 3 is a perspective view showing an outer appearance of the groove member 4 of FIG. 2. A plurality of groove portions 41 each having a crest size of 31.5 μm and a root width of 32 μm are formed on the upper surface of the groove member 4, and notched shoulder portions 4a and 4b are formed on the two sides of the groove member 4, as shown in FIG. 3. As a result, the molten resin flows in the direction of an arrow X.

The notched shoulder portions 4a and 4b define flow channels for allowing the resin to sufficiently flow to the plate portion 11a of the cavity 11 described above.

Figure 4:
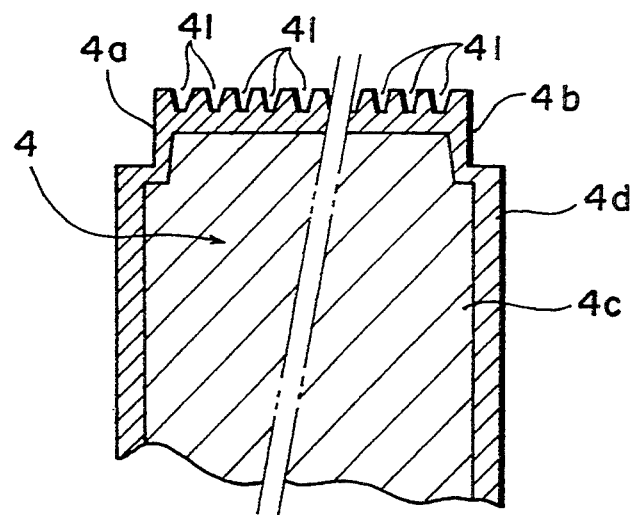
FIG. 4 is a sectional view showing the structure of the groove member.

FIG. 4 is a sectional view of the groove member 4 constituted by a base material portion 4c having a high heat conductivity and a hard layer 4d formed on the surface of the portion 4c and having a substantially uniform thickness. The material of the base material portion 4c having the high heat conductivity has a wide choice. A good result was obtained when phosphor bronze was used as the material of the base material portion 4c, the nickel plating layer 4d was formed on the surface of the base material portion 4c by electroplating, and the plating layer was machined to form groove portions 41 equidistantly by using a special-purpose cutting device.

When the groove member 4 is fabricated in the above manner, the heat conductivity is increased to promote hardening of the resin, and the wear resistance of the groove portions 41 is improved.

Figure 5:
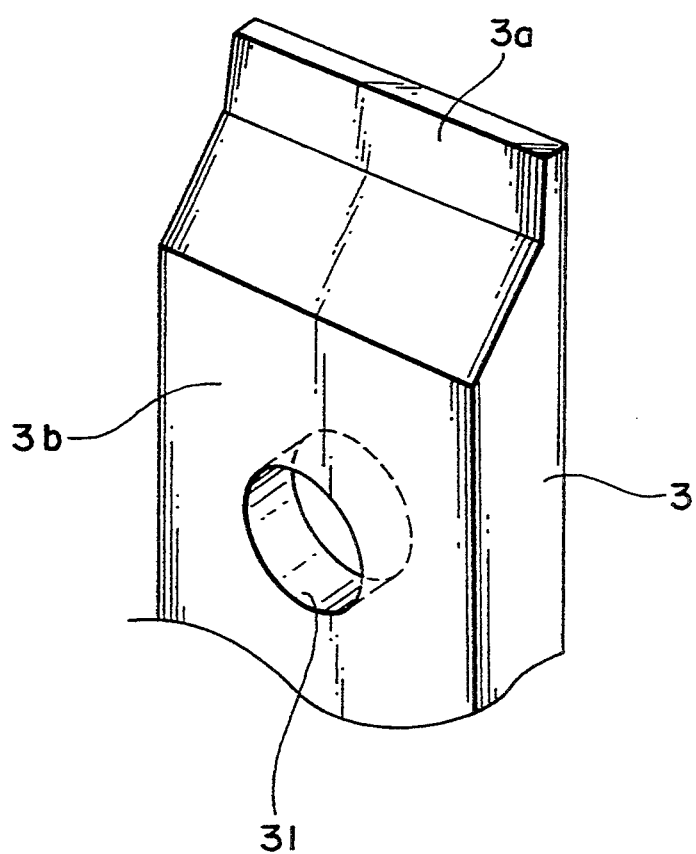
FIG. 5 is a perspective view showing an outer appearance of an ejector pin.

FIG. 5 is a partial perspective view showing an outer appearance of the ejector pin 3. The ejector pin has a flat angular shape, as shown in FIG. 5, since it is used to eject the plate portion molded in the second narrow portion 11a from the cavity 11 when the mold is opened.

The ejector pin 3 having the above shape has the projecting portion 3a described above and a thick-walled portion 3b, and a hole portion 31 for passing cooled air through it is formed in the central portion of the thick-walled portion 3b.

Figure 6:
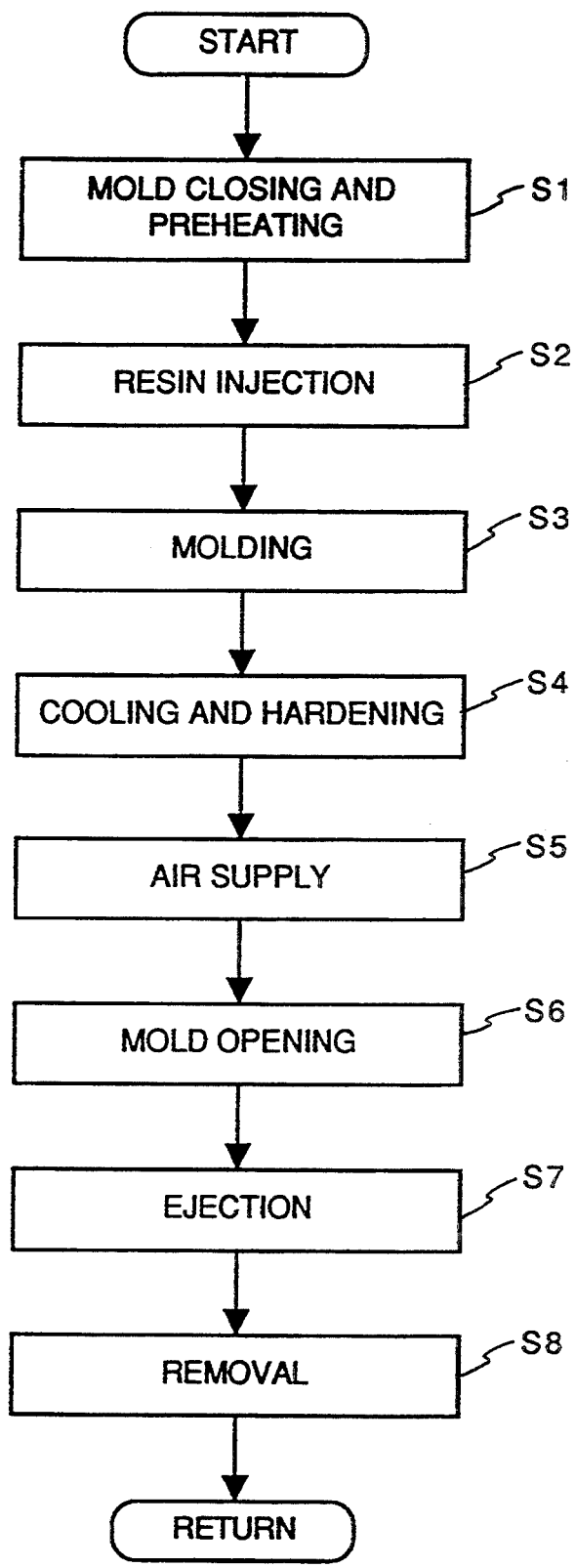
FIG. 6 is an operation flow chart.

The operation of the metal mold described above will be described with reference to the flow chart of FIG. 6. After molding is started, the mold is closed and preheated in step S1. When a sensor 101 (FIG. 1) detects that the preheat temperature has increased to a predetermined temperature, the flow advances to step S2, and a molten resin is injected from a nozzle (not shown) to the sprue 103. The molten resin is filled in the plate portion 11a of the cavity 11 through the runner 12 and the gate G. At this time, since the portion 11b defined by the cavity 11 and the plate portion 11a becomes narrow due to the limitation in shape of the molded body, the flow of the molten resin may be interfered with. However, in fact, the molten resin passes through the shoulder portions 4a and 4b of the groove member 4 as the flow channels to be readily filled in the plate portion 11a of the cavity 11. Also, since the metal mold is kept at a high temperature, the molten metal is effectively filled also in the groove portions 41 having small grooves and the narrow portion 11b that molds a plate thin-walled portion in the good molten state.

Step S3 is completed in the above manner, and in step 54 a predetermined cooling time is necessary to harden the resin in the cavity 11. Almost simultaneously, in step 55, air is injected from the hole portion 31 of the ejector pin 3 to the gap portion defined between the ejector pin 3 and the groove member 4 to cool the groove member 4, thereby promoting cooling and hardening of the precision portion molded by the groove portions 41. After that, the flow advances to step 56 to open the mold at the parting surface PL and the like, and the molded body is ejected by the ejector pin 3 and the like in step S7. Finally, the molded body is removed in step 58 to complete one molding cycle, and a subsequent molding cycle is started.

As described above, when air is forcibly injected to the gap portion defined between the ejector pin 3 and the groove member 4 in step S5 to cool the groove member 4, time required for ejecting the molded body can be shortened. Also, since the base material portion 4c of the groove member 4 is constituted by a material having a high heat conductivity, cooling is performed rapidly.

To form the groove portions 41 of the groove member 4, the hard layer 4d is formed by nickel plating or the like, and thereafter is machined by cutting or the like to form the groove portions 41. As a result, the shape of the groove portions 41 does not depend on the thickness of the nickel plating layer, and the groove portions 41 can be formed at higher precision than a case in which groove portions 41 are formed by only plating a hard layer 4d.

Figure 7:
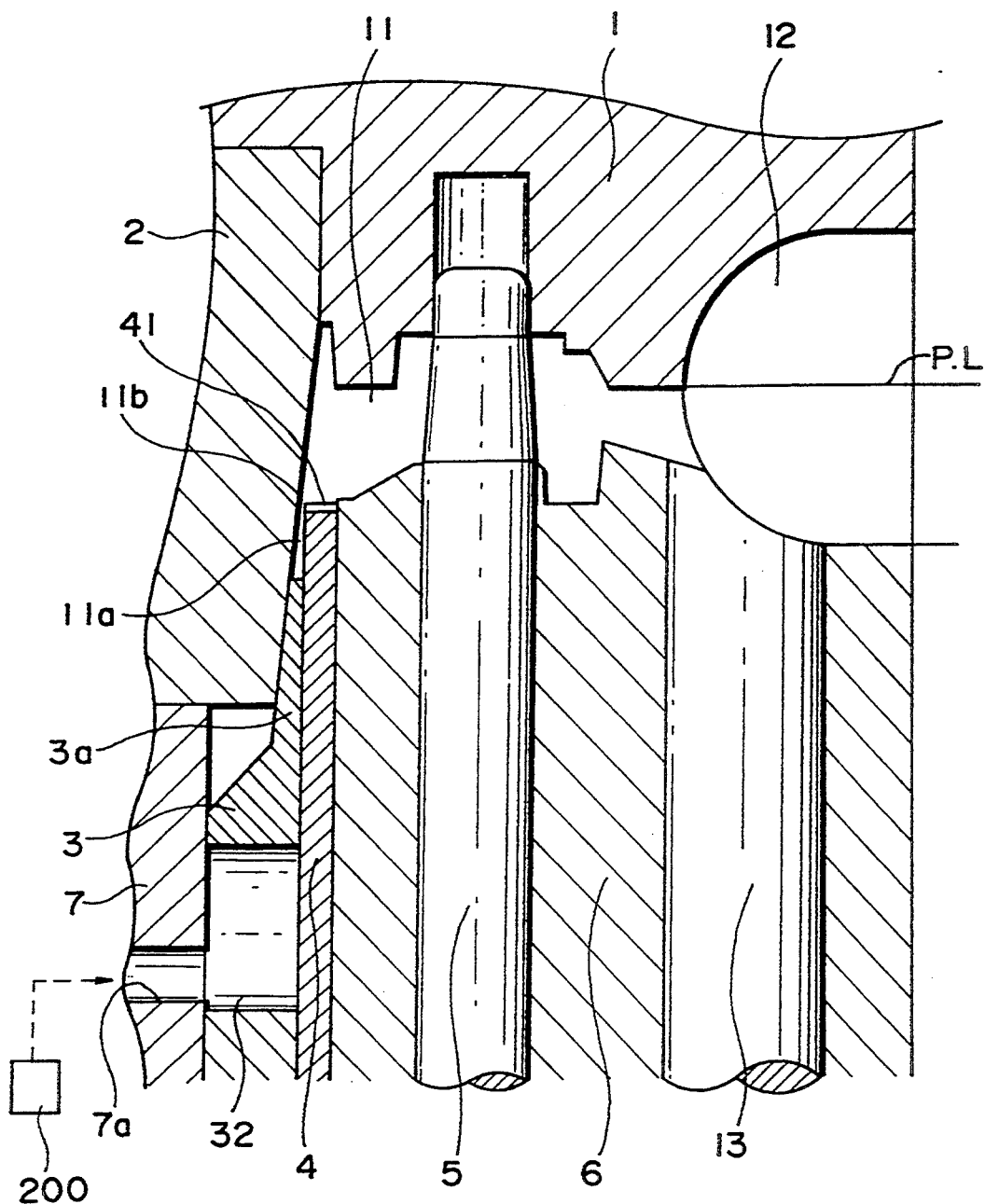
FIG. 7 is a sectional view showing in detail the main part including a cavity according to the second embodiment of the present invention.
Figure 8:
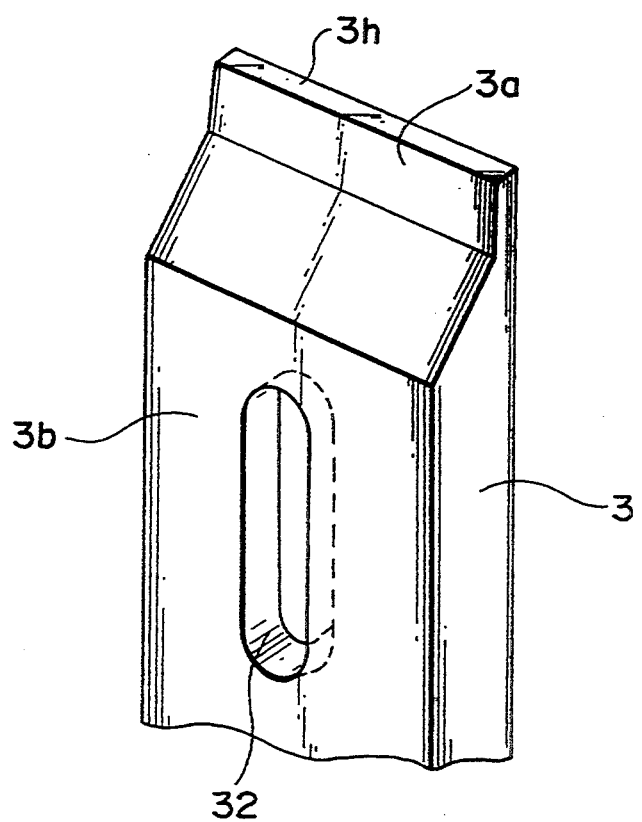
FIG. 8 is a perspective view showing an outer appearance of an ejector pin according to the second embodiment of the present invention.

FIG. 7 is a detailed sectional view showing the main part including a cavity according to the second embodiment of the present invention. Since the metal mold of the second embodiment is fabricated substantially in the same manner as the metal mold of the first embodiment, the identical portions are denoted by the same reference numerals to omit a detailed description thereof, and only different portions will be described. The position of an ejector pin 3 is regulated by a movable side press member 7, and an elongated hole portion 32 is formed in the ejector pin 3 to open to a hole portion 7a formed in the movable side press member 7. The elongated hole portion 32 is formed to extend toward an upper end portion 3h of a projecting portion 3a of the ejector pin 3 having a tapered distal end. Therefore, the upper end portion 3h and hence groove portions 41 can be cooled more efficiently by a cooling air flow supplied from an air pump 200.

As has been described above, according to the present invention, the molding member for molding the precision portion of a body and a cavity main portion are separately formed. In addition, the molding member for molding small grooves is made of a material having a high heat conductivity, and a hard layer is formed on the surface of the molding member, thereby constituting a molding portion. As a result, the precision portion can be quickly cooled to shorten the molding cycle. Furthermore, since the groove portions of the precision portion can be made of a material having a high hardness, durability is improved.

Although the above embodiments have exemplified molding of an ink-jet recording head component, the present invention is not limited to it and is applicable to any molded body, at least part of which has a precision molding portion.

As has been described above, according to the present invention, time required by a molding cycle of a molded body having a precision portion can be shortened.

In addition, durability of a cavity for molding a body having a precision portion can be improved.

Furthermore, working cost of the cavity for molding a body having a precision portion can be decreased, and maintenance and exchange of a precision molding portion can be facilitated.

As many apparently widely different embodiments of the present invention can be made without departing from the spirit and scope thereof, it is to be understood that the invention is not limited to the specific embodiments thereof except as defined in the appended claims.

What is claimed is:

1. An injection-molding metal mold used for injection-molding a body having a precision portion which is formed at high precision, comprising:
    means defining a molding cavity having a molding member with a precision molding portion formed to mold the precision portion, and general molding portions for molding other portions of the body;
    an ejector pin, disposed adjacent to said molding member to partially form the cavity, for ejecting a molded body; and
    cooling means for cooling said molding member through said ejector pin.

2. The metal mold according to claim 1, wherein
    said cooling means has an air supply unit, and said molding member is cooled with an air flow from said cooling means through a through hole portion formed in said ejector pin.

3. The metal mold according to claim 2, wherein
    said through hole portion is formed to have an elongated hole having a major axis extending toward the cavity.

4. An injection-molding metal mold used for injection-molding a body having precision grooves for discharging ink and used in an ink-jet recording apparatus, comprising:
    a general mold member having a molding cavity in which an injection-molding is performed, said general mold member being comprised of a fixed mold member, a moving mold member and an ejector member for ejecting the molded body; and
    a precision mold member cooperating with said general mold member to form the molding cavity and molding the precision grooves of the molded body, wherein said precision mold member is made of a base portion and a layer having a higher hardness than said base portion and formed on said base portion, with said base portion having a heat conductivity higher than that of said general mold member for molding the precision grooves, and said layer of higher hardness defining a plurality of molding grooves for molding the precision grooves of the molded body, such that said molding grooves are only formed in said layer of higher hardness.

5. An injection-molding metal mold according to claim 4, wherein said base portion is made of phosphor bronze.

* * * * *

UNITED STATES PATENT AND TRADEMARK OFFICE
CERTIFICATE OF CORRECTION

PATENT NO. : 5,419,697   Page 1 of 2
DATED : May 30, 1995
INVENTOR(S) : Hirano et al.

It is certified that error appears in the above-indentified patent and that said Letters Patent is hereby corrected as shown below:

[57] ABSTRACT:

Line 17, "cavity;" should read --cavity,-- and "body;" should read --body,--.

COLUMN 1:

Line 13, "mold more" should read --mold. More--.

COLUMN 2:

Line 47, "achieve" should read --correct--.

COLUMN 4:

Line 19, "cycle. When" should read --cycle. ¶ When--.
Line 24, "shortened. More" should read --shortened. ¶ More--.

UNITED STATES PATENT AND TRADEMARK OFFICE
CERTIFICATE OF CORRECTION

PATENT NO. : 5,419,697
DATED : May 30, 1995
INVENTOR(S) : Hirano et al

It is certified that error appears in the above-indentified patent and that said Letters Patent is hereby corrected as shown below:

COLUMN 6:

Line 65, "58" should read --S8--.

Signed and Sealed this

Fourteenth Day of November, 1995

Attest:

BRUCE LEHMAN

Attesting Officer

Commissioner of Patents and Trademarks